(12) United States Patent
Tanner

(10) Patent No.: US 8,490,797 B2
(45) Date of Patent: Jul. 23, 2013

(54) APPARATUS FOR, AND METHOD OF, SEPARATING CYLINDRICAL BODIES

(75) Inventor: Marcel Tanner, Bassersdorf (CH)

(73) Assignee: Krones AG, Neutraubling (DE)

( * ) Notice: Subject to any disclaimer, the term of this patent is extended or adjusted under 35 U.S.C. 154(b) by 214 days.

(21) Appl. No.: 13/002,626

(22) PCT Filed: Jul. 15, 2009

(86) PCT No.: PCT/CH2009/000255
§ 371 (c)(1),
(2), (4) Date: Jan. 4, 2011

(87) PCT Pub. No.: WO2010/006461
PCT Pub. Date: Jan. 21, 2010

(65) Prior Publication Data
US 2011/0108468 A1    May 12, 2011

(30) Foreign Application Priority Data

Jul. 17, 2008    (CH) ...................................... 1109/08

(51) Int. Cl.
*B07C 5/00*    (2006.01)

(52) U.S. Cl.
USPC ............ 209/658; 209/522; 209/530; 198/389

(58) Field of Classification Search
USPC .......... 209/522–525, 530, 657, 658; 425/534; 198/389
See application file for complete search history.

(56) References Cited

U.S. PATENT DOCUMENTS

| | | | | |
|---|---|---|---|---|
| 3,433,966 A | * | 3/1969 | Letch et al. ............... | 250/223 B |
| 4,223,778 A | * | 9/1980 | Kontz .......................... | 198/389 |
| 4,244,459 A | * | 1/1981 | Garrett .......................... | 198/389 |
| 5,186,307 A | * | 2/1993 | Doudement et al. .......... | 198/454 |
| 6,575,305 B1 | * | 6/2003 | Casagrande ................... | 209/616 |
| 6,968,936 B2 | * | 11/2005 | Charpentier .................. | 198/389 |
| 7,556,137 B2 | * | 7/2009 | Charpentier .................. | 198/395 |
| 8,109,381 B2 | * | 2/2012 | Deyerl .......................... | 198/389 |
| 8,337,193 B2 | * | 12/2012 | Brown .......................... | 425/534 |
| 2009/0095598 A1 | * | 4/2009 | Stoiber et al. ................. | 198/617 |
| 2011/0120833 A1 | * | 5/2011 | Tanner .......................... | 198/444 |
| 2011/0198270 A1 | * | 8/2011 | Beutl et al. .................... | 209/552 |

FOREIGN PATENT DOCUMENTS

DE               60118772      5/2007

OTHER PUBLICATIONS

Written Opinion of the International Searching Authority of International Application No. PCT/CH2009/000255, Feb. 11, 2011.

* cited by examiner

*Primary Examiner* — Joseph C Rodriguez
(74) *Attorney, Agent, or Firm* — Marshall, Gerstein & Borun LLP

(57) ABSTRACT

An arrangement for separating cylindrical bodies, such as parisons for hollow bodies, which have at least one protuberance at a first end, has a pair of parallel guide elements between which the cylindrical bodies can be erected in that the cylindrical bodies hang on the guide elements in each case by way of the protuberance. The separation arrangement here has a height guide, wherein a spacing between the height guide and the cylindrical bodies, as seen in the conveying direction, decreases to a predetermined spacing in relation to the guide elements, as a result of which vertically projecting cylindrical bodies, as they are being conveyed in the conveying direction, are forced downwards by the height guide and wherein the height guide can be raised briefly by means of a lifting device in accordance with a triggering signal.

20 Claims, 10 Drawing Sheets

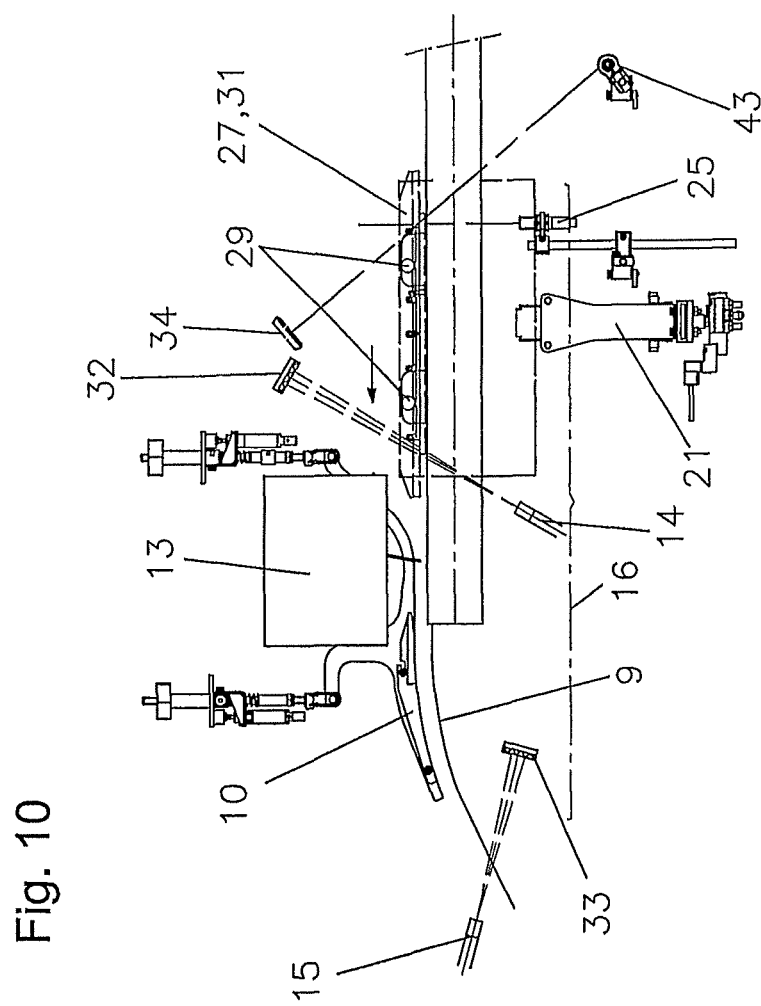

APPARATUS FOR, AND METHOD OF, SEPARATING CYLINDRICAL BODIES

The invention relates to the field of singling bulk goods, in particular to an apparatus and a method for singling cylindrical bodies according to the preamble of the corresponding independent patent claims.

PRIOR ART

Preforms of PET bottles are conventionally delivered unsorted as bulk goods in large containers and conducted across a loading device to a singling device. The singling device sets up the preforms and forms a single row of the preforms, which leaves the singling device, for example via an obliquely downwardly directed slide, also referred to as run-off track. From here the preforms are transported to the testing and inspection devices and conveying devices, and lastly to a stretch blowing machine where their cylindrical body is blown into a desired bottle form. The preforms have typically a screw header at an open end with a threaded fitting and a collar or bearing ring having a greater diameter than the remaining cylinder portion of the preform.

DE 601 18 772 T2 describes a singling device realized as a roller conveyor. This conveyor comprises two rollers spaced apart relative to one another, which rollers are disposed at the funnel-shaped bottom of a long stretched-out container.

The rollers rotate about their longitudinal axes and form a conveyor path which conventionally runs at a minimal downward inclination. Aligned one after the other in a single row, the preforms are transported by this roller conveyor. For this purpose they are in contact with their collars on the rollers, wherein, due to the force of gravity, their bodies with the cylinder portion are freely suspended in the gap between the rollers. Preforms that do not assume the correct position and therefore project beyond a predetermined height are ejected out of the conveyor path by means of a rotating kick wheel or back-force wheel back into a rearward region of the roller conveyor or into an overflow region from which they are again conveyed into a filler container of the roller conveyor.

Due to the high conveying capacity of such singling devices, very high reliability and freedom from trouble is required in order to avoid downtimes of the subsequently following installation with corresponding consequential costs. In known devices, for example, preforms which are resting with their collars on the collar of an adjacent preform or preforms which are disposed horizontally on the gap between the rollers cannot be picked up and ejected. In the subsequent areas of the installation, trouble and consequently interruptions of operation result. It was found that the reliability of known singling devices does not meet the high requirements and that further improvement of the interference resistance is necessary.

DESCRIPTION OF THE INVENTION

The invention therefore addresses the problem of providing a singling apparatus and a method of the above described type which eliminate the above described disadvantages. The invention is to ensure in particular that positional errors of preforms which were previously not detectable are detected with high reliability and are automatically eliminated.

This problem is resolved by a singling apparatus for cylindrical bodies and a method with the characteristics of the corresponding independent patent claims.

The singling apparatus is laid out for cylindrical bodies, such as preforms for hollow bodies, which bodies at a first end have at least one projection or a bearing ring and at a second end a diameter that is less than the diameter of the projection. The singling apparatus includes a pair of parallel guidance elements between which the cylindrical bodies can be set up thereby that the cylindrical bodies are suspended by the projection on the guidance elements, thus point with the second end downwardly. The cylindrical bodies form a single row along the guidance elements and can thus be conveyed to a run-off for further conveyance of the cylindrical bodies.

The singling apparatus comprises a height guidance above the single row, wherein a distance between the height guidance and the cylindrical bodies, viewed in the direction of conveyance, decreases to a predetermined distance from the guidance elements, whereby vertically projecting cylindrical bodies, by being conveyed in the direction of conveyance, are pressed or guided downwardly through the height guidance. The height guidance is herein liftable for a short time by means of a lifting arrangement according to a trigger signal.

It becomes hereby feasible to temporarily free cylindrical bodies which have become jammed against, respectively under, the height guidance. Since the jamming, as is shown, often stems from the fact that a preform is with its collar in contact on the collar of an adjacent preform, the superjacent preform can slide into the correct position after the jamming has been released.

The distance between the height guidance and the cylindrical bodies is usefully settable according to the height of the bodies, e.g. according to the height by which the cylindrical bodies project vertically beyond the guidance elements if they are properly suspended by their collar on the guidance elements.

In a preferred embodiment of the invention the guidance elements are rollers, in particular counter-rotating rollers, and the cylindrical bodies are conveyed in an interspace between the rollers. The singling apparatus thus is based on the principle of a roller conveyor. In principle, the invention can also be implemented with other types of guidance elements, for example with rails and, for example, in a shaker conveyor.

Lifting the height guidance can take place through a parallel movement or also through a tilt movement. The lifting can, for example, also be performed through pneumatically or electromagnetically acting actuators.

In a further preferred embodiment of the invention the singling apparatus includes a jamming detection device, which is realized to detect the abutting of a cylindrical body on the height guidance and thereupon to generate a trigger signal for lifting the height guidance. It becomes thereby feasible to selectively and specifically lift the height guidance in the presence of jamming.

This jamming detection device is preferably realized for the purpose of acquiring whether cylindrical bodies are present, in the direction of conveyance, in front of the height guidance and whether in a region after the height guidance no cylindrical bodies exist, and if these two conditions are met, to generate the trigger signal. The jamming detection device thus detects a jam in the conveyor path of the preforms in the region of the height guidance and therewith also implicitly detects a jamming against the height guidance.

The guidance elements of the run-off and potential further elements, which determine the course of the single row of cylindrical bodies, will be combined in the following under the term 'conveyor path'.

In a further preferred embodiment of the invention the jamming detection device comprises a first presence detector, in particular a first photoelectric interrupter-relay, or light barrier, which detects in a region of a conveyor path of the cylindrical bodies in front of the height guidance the presence of cylindrical bodies and a second presence detector, in particular a second light barrier, which detects in a region of the conveyor path of the cylindrical bodies behind the height guidance the presence of cylindrical bodies. According to this embodiment, thus a jam is detected if the cylindrical bodies are abutting in front of the height guidance and none are abutting behind the height guidance. Therewith a jam detection is feasible with simple means.

In a further preferred embodiment of the invention one or both presence detectors are a light barrier and, with respect to the conveyor path, are each so disposed that the beam of the light barrier, if the cylindrical bodies are directly successive to one another on the conveyor path, is in each instance guided through several of the cylindrical bodies. The beam of the light barrier is preferably inclined with respect to the conveyor path, respectively with respect to the single row of cylindrical bodies moving therein, e.g. it extends at an angle of less than 90 degrees, preferably less than 70 degrees, with respect to the conveyance direction of the cylindrical bodies. The light barrier can be a transmitted light barrier (one-way light barrier) or a reflection light barrier.

Instead of light barriers, other sensors or other dispositions of sensors are in principle also employable, which detect the presence of a group of cylindrical bodies in a predetermined region of the conveyor path. Individual light barriers or groups of light barriers (light grids or light curtains) or line sensors or cameras or reflection light scanners or ultrasonic sensors or mechanical sensors, for example, are conceivable, which are oriented, for example laterally or from above, respectively below, onto the conveyor path and the single row of conveyed bodies.

In a further preferred embodiment of the invention the height guidance is disposed in the proximity of a back-force wheel (or kick wheel) and blades of the rotating back-force wheel include a cutout which corresponds to the shape of the height guidance. The blades project herein in a region in which the height guidance is not yet active downwardly beyond the height guidance. Therewith an especially space-saving combination of the back-force wheel with the height guidance is feasible. However, in principle it is also feasible to dispose the back-force wheel in front of the height guidance along the conveyor path. This combination has the advantage that, while further-projecting cylindrical bodies and those loosely superjacent cylindrical bodies are picked up by the back-force wheel and flung backward counter to the direction of conveyance, and while less-far projecting cylindrical bodies are not picked up by the back-force wheel, they are however, subsequently picked up by the height guidance. Thus, viewed in the direction of conveyance, first the back-force wheel and subsequently the height guidance are effective. In both cases the blades of the back-force wheel project at the lowest location preferably further downwardly than the height guidance. Although therewith the back-force wheel should theoretically pick up all cylindrical bodies which would abut at the height guidance, it has been found in practice that even then the cylindrical bodies are occasionally jammed against the height guidance.

In a further preferred embodiment of the invention the singling apparatus includes an ejection arrangement which detects cylindrical bodies, which, while they are caught with the projection on the guidance elements, their second end, however, is not suspended downwardly, and ejects them from the single row.

Such a malposition can occur, for example, if the lower end of the cylindrical body, due to fabrication errors or tolerances, is too wide and thereby remains caught on the guidance elements instead of rotating downwardly into the vertical position. Another cause can be that two preforms are stuck on one another and thus jointly remain in a horizontal position between the guidance elements. In both cases, what is acquired is that a preform is existent, however not correctly oriented and thereupon the ejection is triggered.

The ejection arrangement preferably comprises a parallel-position detection device with a presence detector and a position detector. The presence detector herein determines the presence of a cylindrical body between the guidance elements, and the position detector determines the orientation of the cylindrical body. In the presence of a cylindrical body in incorrect orientation, thus substantially located parallel to the guidance elements, the parallel-position detection device triggers the ejection of the cylindrical body.

The presence detector is preferably a light barrier, in particular a light barrier whose beam is guided from above downwardly or conversely, through the single row of the cylindrical bodies.

In a preferred embodiment of the invention the position detector detects the presence of the second ends of the cylindrical bodies in a region beneath the guidance elements. Therewith detection of position is feasible with simple means. The position detector preferably comprises an ultrasonic sensor implemented as a distance meter or proximity switch, which sensor measures the distance from the ultrasonic sensor to the expected position of the second ends of the cylindrical bodies and, if this distance exceeds a predetermined value, signals the incorrect orientation of the corresponding cylindrical body.

For the presence as well as also for the position detection, alternatively also single or groups of light barriers (light grids or light curtains) or line sensors or cameras or reflection light scanners or ultrasonic distance meters or mechanical sensors, for example, are conceivable, which, for example, are directed laterally or from above, respectively from below, onto the conveyor path and the single row of conveyed bodies.

The ejection arrangement further comprises preferably a movable ejection means, which, for the ejection of an incorrectly oriented cylindrical body, moves from below between the guidance elements and thus lifts this cylindrical body and ejects it. The ejection arrangement can, moreover, comprise an associated blow-gun device for laterally blowing away the cylindrical body after the lifting.

In a further preferred embodiment of the invention the singling apparatus comprises further a resting detection facility, which acquires whether a cylindrical body is resting on the cylindrical bodies conveyed in the single row or is laterally in contact. If this is the case, an associated blow-gun device for laterally blowing away a cylindrical body from the guidance elements, respectively the single row, is activated.

The resting detection facility preferably comprises a light barrier, whose beam extends substantially horizontally and at an angle, preferably substantially perpendicularly, to the course of the guidance elements, respectively the single row. The height of the beam is set such that the light barrier responds in the event cylindrical bodies are resting one on the other. Thus, if the cylindrical bodies are in their normal position, the beam extends above the cylindrical bodies and the light barrier does not respond. The light barrier can be disposed at a location of the conveyor path at which the blowing-out also takes place. In this case, the blowing-out is triggered without substantial delay after the light barrier has responded. If the blowing-out only takes place at a later location, it is only triggered a certain length of time after the light barrier has responded, which time corresponds to the conveying speed.

In a further preferred embodiment of the invention, the blow-gun device associated with the ejection arrangement is identical with the blow-gun device associated with the resting detection facility. This yields a simplification of the overall arrangement combined with increased functionality.

In a further preferred embodiment of the invention the singling apparatus comprises the ejection arrangement as well as also a kick wheel and an adjustable height guidance. Furthermore, optionally also a lateral blow-gun device can be provided for the elimination of horizontally resting bodies. With this combination of elements malpositions of different type can be detected in complementary manner and be eliminated whereby overall very high reliability results.

In a further preferred embodiment of the invention the ejection arrangement and the adjustable height guidance employ at least one sensor jointly. Thus, for example, a light barrier which acts as a presence detector of the ejection arrangement can also be utilized for the detection of a jam in front of the height guidance. In the analysis of the sensor signals for the height guidance the transport time between ejection arrangement and height guidance is potentially taken into consideration and whether or not the ejection arrangement has recently been triggered.

The above described arrangements are fundamentally not only suitable for orienting preforms but also all bulk goods which have a support or bearing ring or a contact face or a collar.

Further preferred embodiments are evident in the dependent patent claims. Characteristics of the method claims are analogously combinable with those of the device claims and conversely.

BRIEF DESCRIPTION OF THE DRAWING

In the following the subject matter of the invention will be explained in further detail in conjunction with preferred embodiment examples shown in the attached drawing. Therein depict schematically.

The reference numbers used in the drawing and their significance are compiled in the list of reference numbers. In principle, in the Figures like parts are provided with like reference numbers.

Paths for Implementing the Invention

Figure 1:
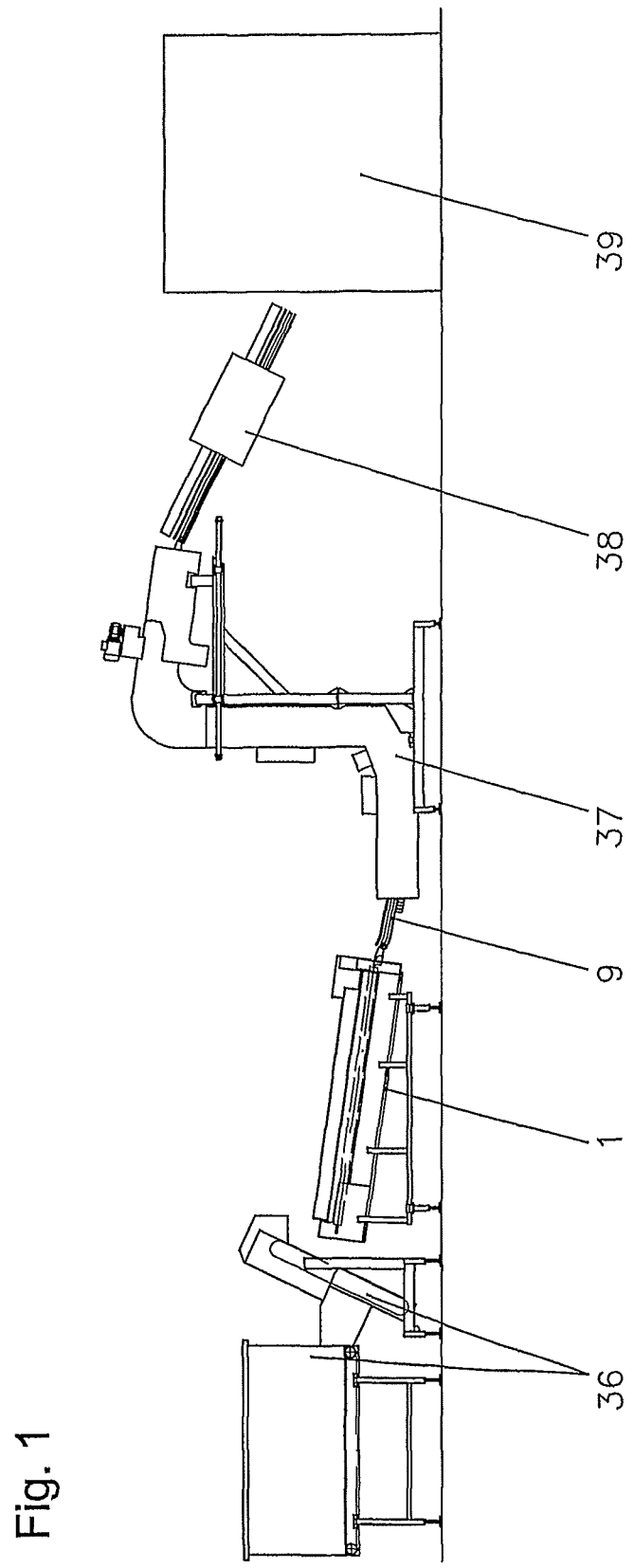
FIG. 1 an overview over a device for loading an automatic production line.

FIG. 1 shows an overview over a device for loading an automatic production line. Herein preforms 2 are, for example, guided from a loading device 36 with a bulk goods container and an ascending conveyor to a singling apparatus 1. In the singling apparatus 1 the preforms 2 are set up and brought into a single row 8. This single row 8 of the preforms 2 leaves the singling apparatus 1 via a run-off track 9 and is transported into a conveyor device 37 with measuring and checking devices and is subsequently supplied via an acceptance device 38 of a forming device 39, for example of an automatic stretch blowing machine. In this connection, in the following the term preforms 2 is used, however, it is understood that the invention can also be utilized analogously for singling and orienting different, substantially cylindrical bodies which have a collar or a bearing ring. The components described in the following are disposed at the end section of the singling apparatus 1, in the transition to the run-off track 9.

Figure 2:
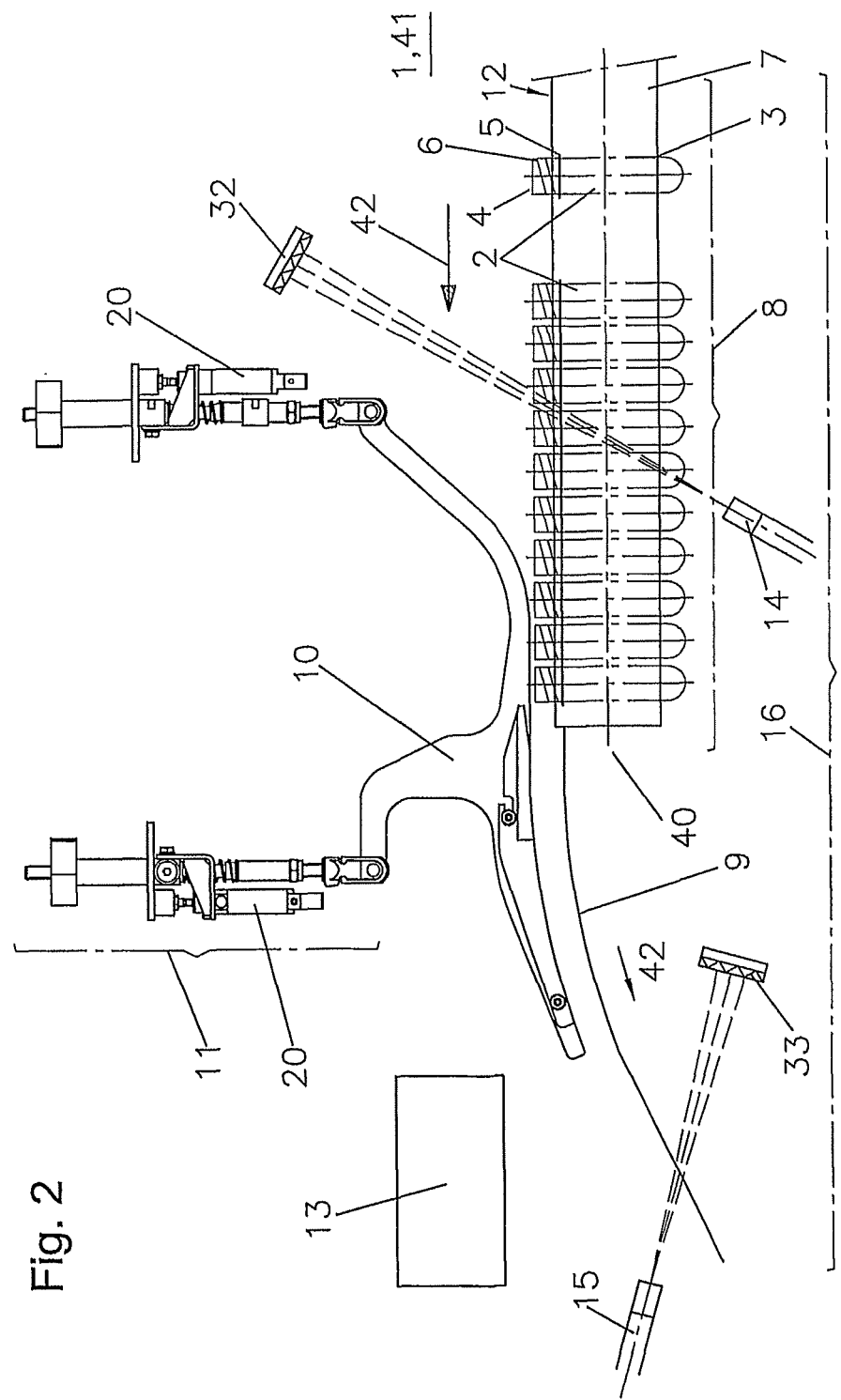
FIG. 2 a side view of a liftable height guidance in a roller conveyor.
Figure 3:
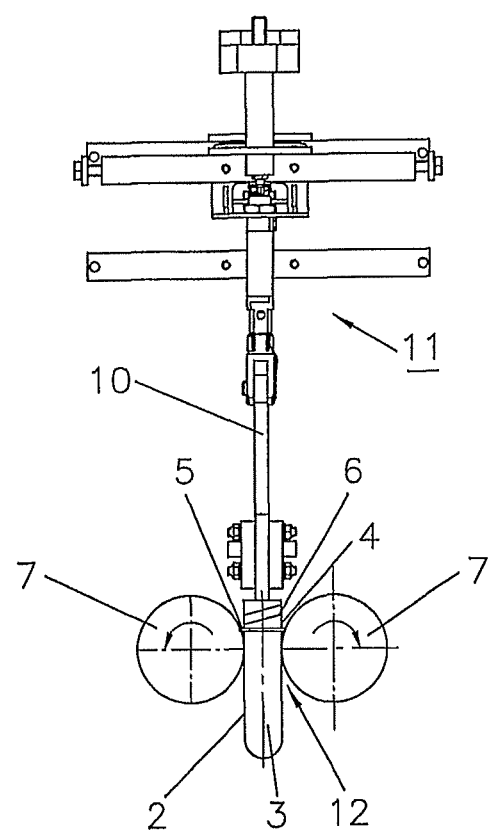
FIG. 3 a view of the height guidance viewed in the conveyance direction.

FIG. 2 shows a side view of a liftable height guidance 10 in a singling apparatus 1, and FIG. 3 a view with a line of sight in the conveyance direction 42. This liftable height guidance 10 is disposed in front of exit end 40 of the singling apparatus 1. The singling apparatus 1 comprises a roller conveyor 41 known per se with two parallel rollers 7. The height guidance 10 is secured on a lifting arrangement 11 and is liftable by actuation of lifting cylinders 20 which are connected via articulation with the height guidance 10. The height guidance 10 is disposed above a conveyor path 16 on which the preforms 2 are conveyed in a single row 8. The single row 8 is formed in known manner in an interspace 12 between two counter-rotating cylinders or rollers 7. The preforms 2 comprise for this purpose a substantially cylindrical form, with an end region 4 with a collar 5 and a threaded fitting 6 on a first end and a cylinder portion 3 at the second end. The cylinder portion 3 has a smaller diameter than the collar 5 such that the preform 2 remains caught between the guidance roller 7 on collar 5.

The single row 8 is conveyed underneath the height guidance 10 to a run-off track 9. In a region—viewed in the conveyance direction 42—in front of the height guidance 10 is disposed a first light barrier 14 with a first reflector 32 such that it responds if one or several of the preforms 2 is/are located in this region of the conveyor path 16. In a region following the height guidance 10, thus for example at run-off 9, a second light barrier 15 with a second reflector 33 is disposed which responds if one or more of the preforms 2 are present in this region of the conveyor path 16. A jamming detection device 13 acquires via (not drawn-in) signal connections the status of the two light barriers and accordingly controls via (not drawn-in) further control connections the lifting cylinder 20 for lifting the height guidance 10.

This is accomplished in the following manner: if, as is shown in FIG. 2, preforms 2 in the single row 8 are closely succeeding one another and their collars 5 are superpositioned or are resting one on the other, such resting preforms 2 are too high and, given the corresponding setting of the height of the height guidance 10, come into contact with it. Thereby, or also for other reasons, the preforms 2 can become jammed against the height guidance 10. As a consequence preforms 2 are no longer conveyed past the height guidance 10 and the second light barrier 15 in the proximity of run-off 9 no longer responds. Due to the preforms 2 jammed up in front of the height guidance 10, the first light barrier 14 responds. If this condition occurs, the jamming detection device 13 triggers the lifting of the height guidance 10. The jammed preforms 2 thereby detach from one another and from the height guidance 10 and slide through run-off 9. The detaching of the preforms 2 from one another and the sliding-off of their collars 5 on one another is supported thereby that the preforms 2 are accelerated on the progressively inclined run-off 9 and no preforms 2 are present in run-off 9 which brake this movement and the singling of the preforms 2. The height guidance 10 is lifted for about one half to one and a half seconds, typically about one second, and subsequently lowered again.

Figure 4:
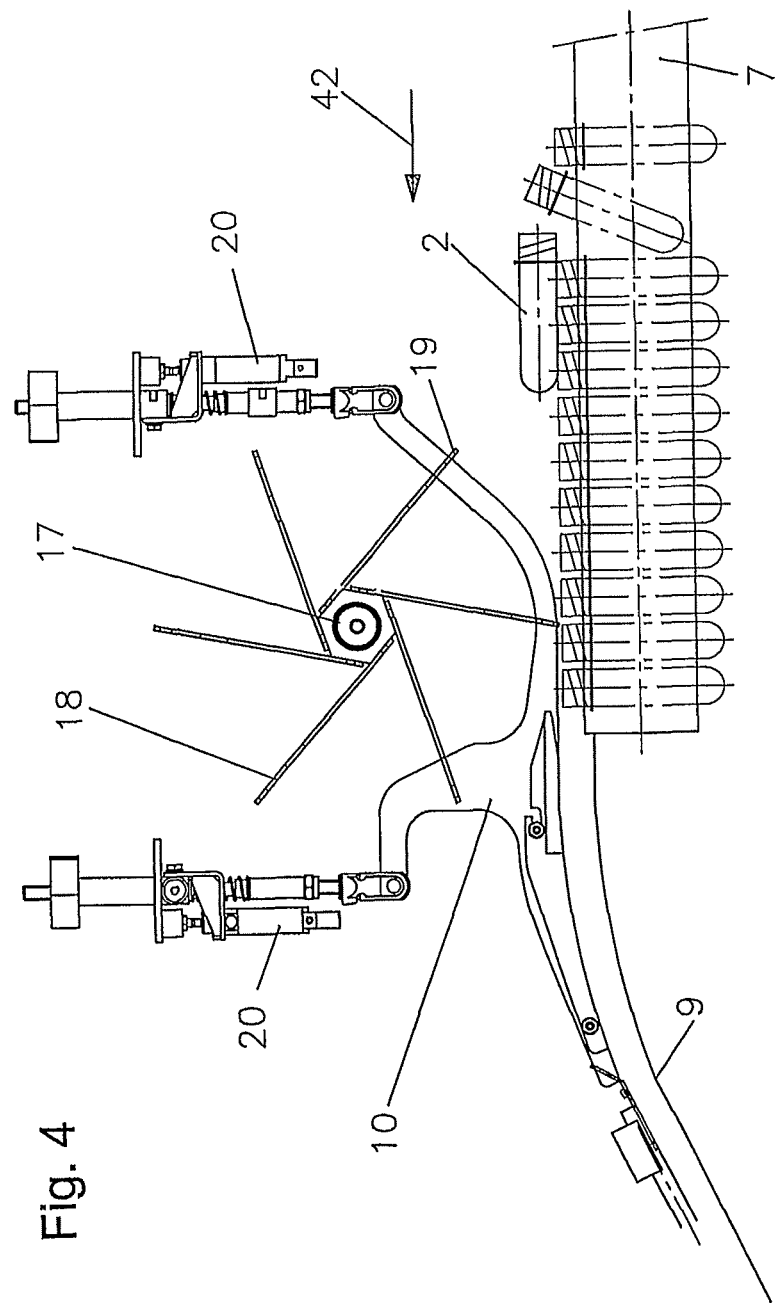
FIG. 4 a view of such a height guidance in combination with a back-force wheel.

FIG. 4 depicts a view of such a height guidance 10 in combination with a back-force wheel or kick wheel 17. The back-force wheel 17 includes paddles or blades 18, each provided with a slot-like cutout 19, in which courses the height guidance 10. The tips of the blades 18 preferably extend at least as low as the height guidance 10 at its lowest site and in a region (viewed in the conveyance direction) in front of the height guidance project the tips further beyond the height guidance 10. Thus the back-force wheel 17 thereby picks up preforms 2 that project too far and into the region of the blades 18 or such that are resting one on the other and ejects these again in the backward direction. Preforms 2 which are not picked up by the back-force wheel 17 can still lead to jamming against the height guidance 10, which, as described, is eliminated by lifting the height guidance 10. The height guidance 10 and the back-force wheel 17 can be height-adjustable jointly or each by itself, whereby adaptation to different geometries of the preforms 2 is feasible.

Figure 5:
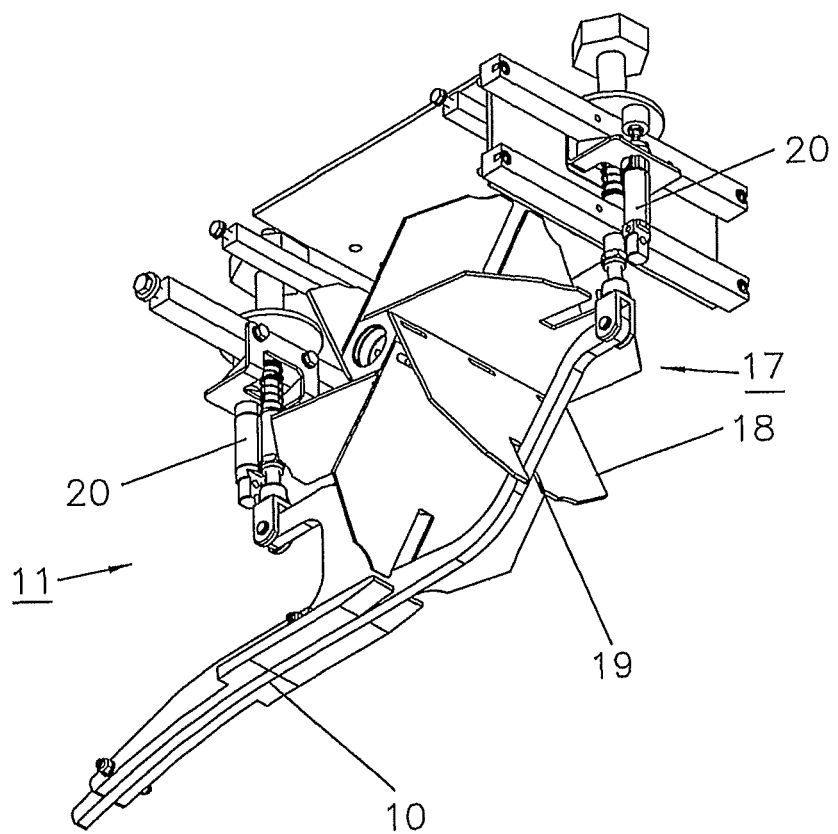
FIG. 5 a perspective view of the disposition of height guidance and back-force wheel, FIG. 6 a side view of an ejection arrangement in a roller conveyor, FIG. 7 a perspective view of the ejection arrangement during the ejection of a conveyed body, FIG. 8 a view of a blow-gun disposition for the removal of resting preforms, FIG. 9 a view of the disposition of FIG. 8 from below, and FIG. 10 a side view of a roller conveyor with a liftable height guidance and an ejection arrangement with a blow-gun device.

FIG. 5 shows a perspective view of the relative disposition of height guidance 10 and back-force wheel 17, in which the cutouts 19 and the course of the height guidance 10 in the cutouts 19 of the rotating blades 18 is evident. The cutouts 19 are deep enough such that even with the height guidance 10 lifted, the latter does not collide with the blades 18. The back-force wheel 17 can alternatively also be briefly lifted together with the height guidance 10.

Figure 6:
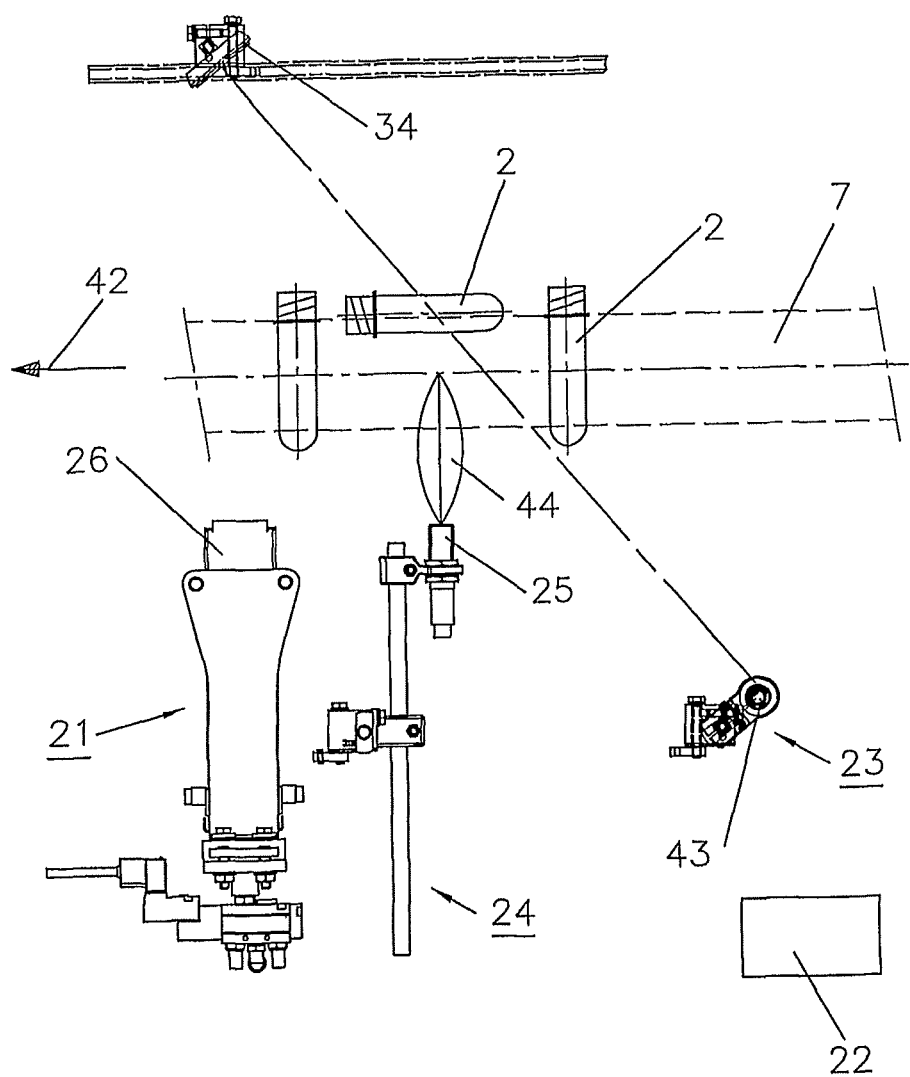

FIG. 6 shows a side view of an ejection arrangement 21 in a roller conveyor. This ejection device 21 in the described example is disposed, seen in the conveyance direction 42, in front of the height guidance 10. The ejection arrangement 21 includes an ejection means 26, in this case a vertically movable body which can be moved from below vertically between the guide rollers 7 and in such a movement pushes a malpositioned preform 2 located between the guide rollers 7 upwardly. The ejection arrangement 21 comprises further a parallel-position detection device 22, which is equipped for analyzing signals of a presence detector 23 and a position detector 24. The presence detector 23 determines whether or not at a predetermined measuring site of the roller conveyor 41 or the conveyor path 16 a preform 2 is present. For this purpose the presence detector 23 is, for example, a light barrier 43 with a reflector 34, which are so disposed that the light beam is directed through the interspace 12 between the rollers 7 of the conveyor path 16 and responds if a preform is present at the measuring site. The position detector 24 simultaneously determines whether or not this preform 2 is also vertically suspended. For this purpose it preferably comprises an ultrasonic sensor 25 which determines a distance to the expected lower end of a preform 2 at the measuring site. An acquisition region 44, in which the ultrasonic sensor 25 responds, is shown schematically in the Figure. If this distance is too great and the presence detector 23 simultaneously reports the presence of a preform 2, the parallel-position detection device 22 automatically triggers the actuation of the ejection means 26 and thereby the ejection of the malpositioned preform 2. The location at which the parallel position is checked typically precedes the location, seen in the conveyance direction, at which the ejection means 26 acts. Between the time of detection of a malpositioned, respectively horizontally disposed, preform 2 and the time of ejection therefore a delay is interspaced. This delay depends on the conveyance rate (depending on the size of the preforms for example about 15,000 to 80,000 pieces/hr) and is, for example, about one half second.

The ejection means 26 can comprise an asymmetric ejection ram which pushes the preform 2 away into a preferred direction laterally or rearwardly. Alternatively, or additionally, the ejection arrangement 21 can comprise a blow-gun device 27 (see FIG. 7), which is activated together with the ejection means 26 and blows the preform 2 laterally away.

Figure 7:
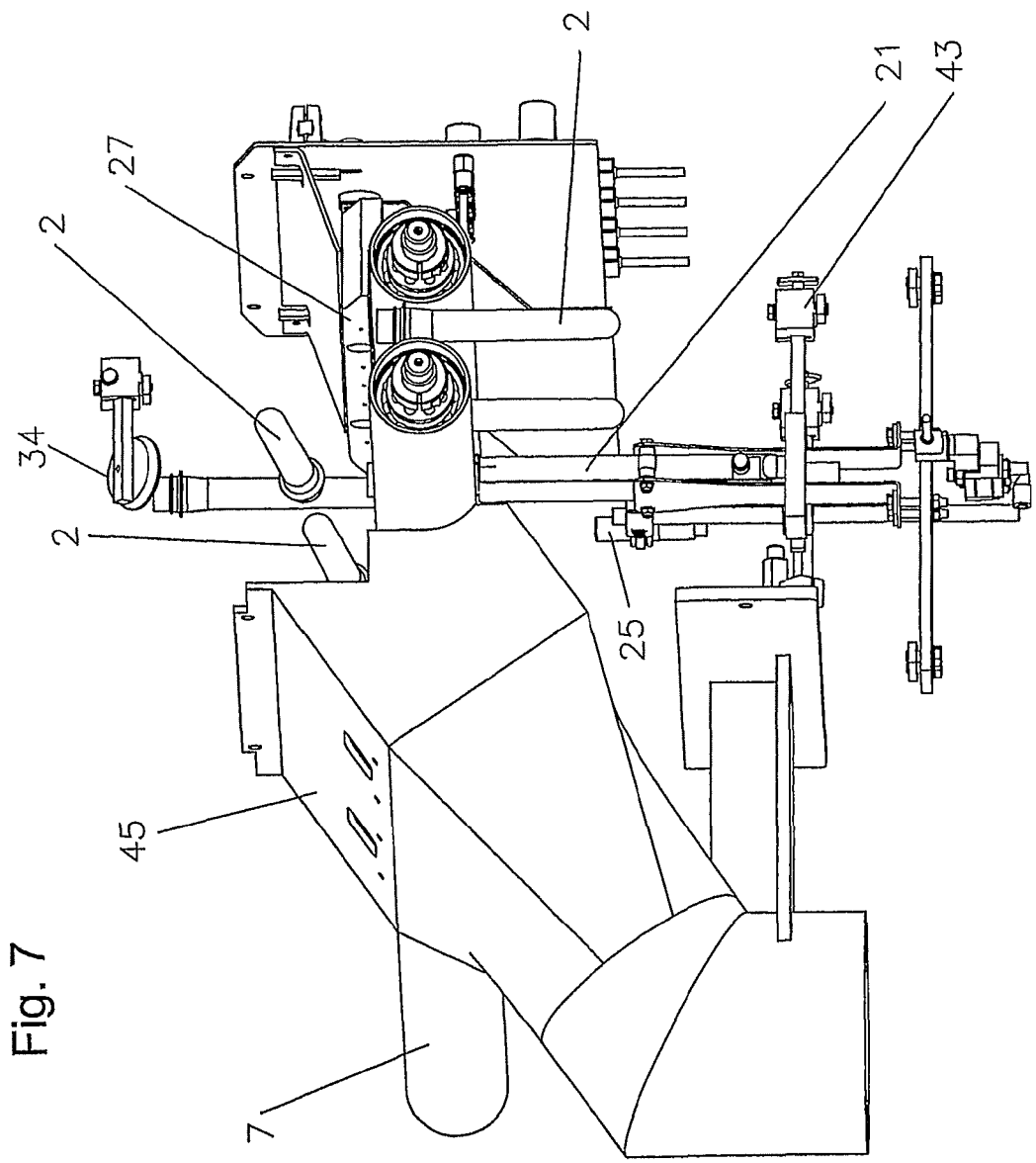

FIG. 7 depicts a perspective view of the ejection arrangement 21 during the ejection of a conveyed body or preform 2 and a possible position of the optional blow-gun device 27. Opposite the blow-gun device 27 is shown a capture arrangement 45. This captures the blown-away preforms 2 which subsequently are guided back to the start of the singling apparatus 1.

Figure 8:
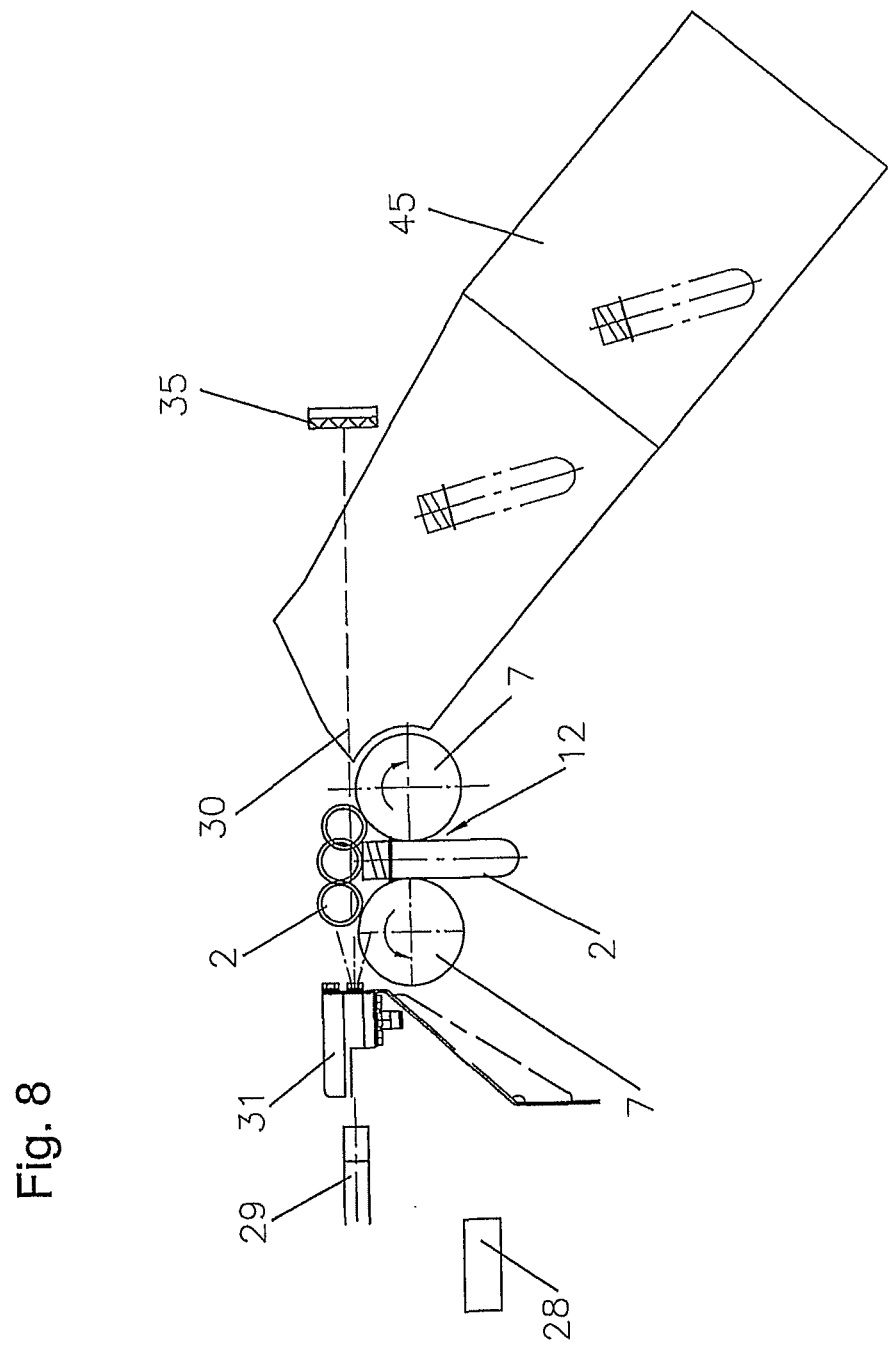
Figure 9:
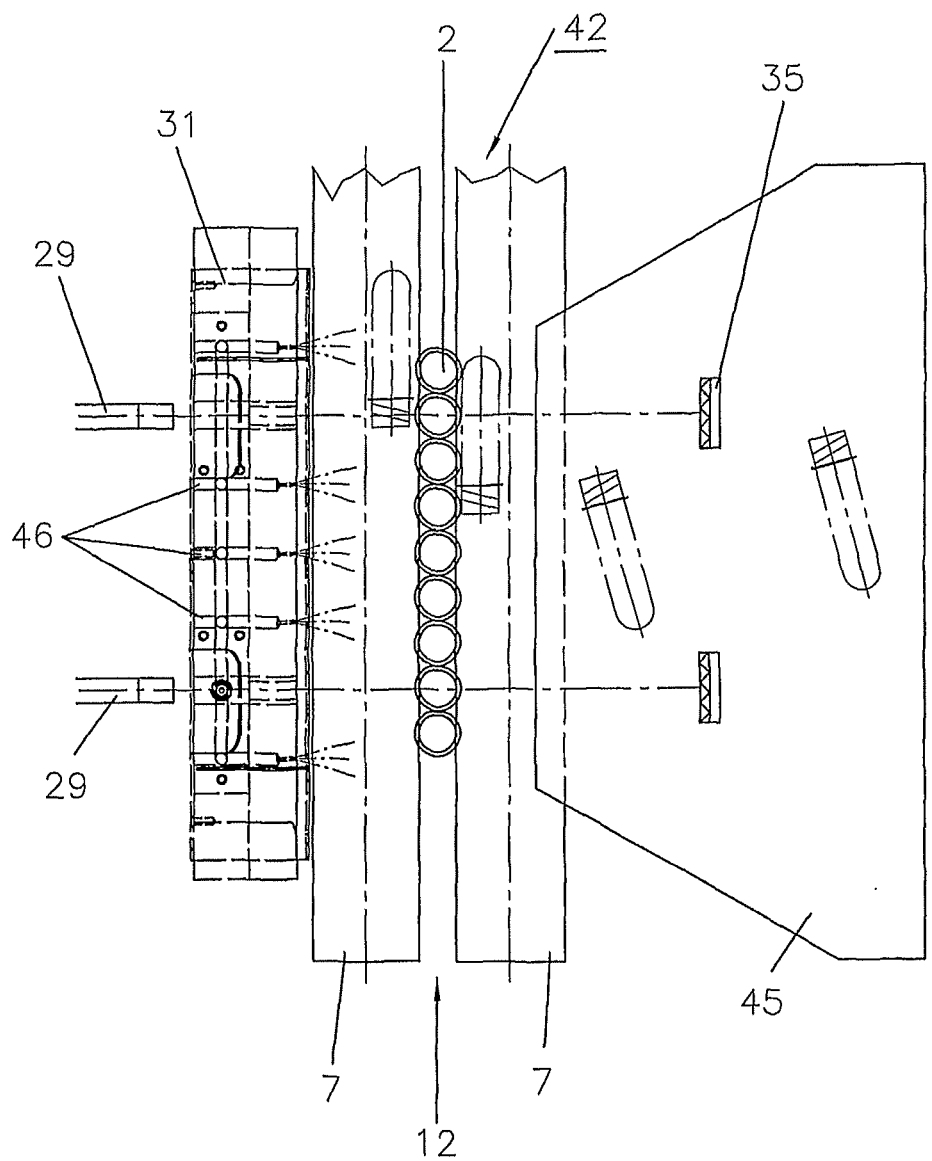

FIG. 8 depicts a view of a resting detection facility 28 with a blow-gun device 31 for the removal of horizontally and/or obliquely resting preforms 2. FIG. 9 shows a view of this disposition from below. The resting detection facility 28 comprises a light barrier 29 with a reflector 35. The beam 30 of the light barrier 29 extends minimally above the correct position of the preforms 2 such that it does not respond if the aligned preforms 2 are at the normal height between the guide rollers 7. If one or several of the preforms 2, as drawn, are positioned on the aligned preforms 2, these interrupt the beam 30. The resting detection facility 28 automatically triggers an air puff by the blow-gun device 31, which blows the preforms 2 laterally away. In a preferred embodiment of the invention several air nozzles 46 are disposed along the conveyance direction 42 as a portion of the blow-gun device 31, such that the preforms 2 are reliably picked up by the air puff. In the depicted preferred embodiment of the invention, moreover, two light barriers 29 are disposed successively in the conveyance direction 42, each with associated air nozzles 46. If, based on the signal of the first light barrier 29, there are still resting preforms 2 after the blowing-out, these are acquired by the second light barrier 29. The reliability of the system is thereby further increased.

The ejection arrangement 21 with the ejection means 26 and the resting detection facility 28 with the blow-gun device 31 are in principle separately realizable.

However, in the preferred embodiment, depicted in FIGS. 7 and 10, of the invention, they are combined with one another. Herein the blow-gun device 27 of the ejection arrangement 21 is identical to the blow-gun device 31 of the resting detection facility 28.

FIG. 10 shows a side view of an embodiment of the invention with liftable height guidance 10 as well as also the ejection arrangement 21 and the resting detection facility with the light barriers 29 combined therewith. In this depiction the height guidance 10 with the kick wheel 17, the ejection arrangement 21 with the associated blow-gun device 27 as well as the blow-gun device 31 are disposed at their preferred position along the conveyor path 16. The depiction shows schematically also the disposition and orientation of the light barriers 15, 14 and 43 as well as of the ultrasonic sensor 25. The preforms 2 are herein conveyed through these components in the conveyance direction 42 to the run-off track 9. Through the combination of these components all preforms 2 which are malpositioned and/or represent a disturbance are removed from the conveyor path 16 or brought into a correct position in front of the run-off track 9.

LIST OF REFERENCE NUMBERS

1 Singling apparatus
2 Cylindrical body (preform)
3 Cylinder portion, second end (2)
4 End region, first end (2)

5 Collar (2)
6 Threaded fitting (2)
7 Guide rollers (1)
8 Single row
9 Run-off track
10 Height guidance (1)
11 Lifting arrangement (1)
12 Interspace
13 Jamming detection device (1)
14 First light barrier (13)
15 Second light barrier (13)
16 Conveyor path
17 Back-force wheel, kick wheel (1)
18 Blade (17)
19 Cutout (18)
20 Lifting cylinder (11)
21 Ejection arrangement (1)
22 Parallel-position detection device (21)
23 Presence detector (22)
24 Position detector (22)
25 Ultrasonic sensor (24)
26 Ejection means (21)
27 Blow-gun device (21)
28 Resting detection facility (1)
29 Light barrier (28)
30 Beam
31 Blow-gun device (28)
32 Reflector (14)
33 Reflector (15)
34 Reflector (22)
35 Reflector (29)
36 Loading device
37 Conveyor device
38 Acceptance device
39 Forming device
40 Exit end (1)
41 Roller conveyor (1)
42 Conveyance direction
43 Light barrier (22)
44 Acquisition region
45 Capture arrangement
46 Air nozzles (31)

The invention claimed is:

1. A singling apparatus (1) for cylindrical bodies (2) which have at a first end at least one projection (5) and at a second end a diameter smaller than the diameter of the projection (5), wherein the singling apparatus (1) includes a pair of parallel oriented guidance elements (7) between which the cylindrical bodies (2) can be set up thereby that the cylindrical bodies (2) are each suspended by the projection (5) on the guidance elements (7) and the cylindrical bodies (2) form a single row (8) along the guidance elements (7) and are thus conductable to a run-off (9) for the further conveyance of the cylindrical bodies (2), characterized in that the singling apparatus (1) comprises a height guidance (10) disposed above the single row (8), wherein a distance between the height guidance (10) and the cylindrical bodies (2), viewed in the conveyance direction, decreases up to a predetermined distance from the guidance elements (7), whereby vertically projecting cylindrical bodies (2), when they are conveyed in the conveyance direction, are pushed downwardly through the height guidance (10), and wherein the height guidance (10) is briefly liftable by means of a lifting arrangement (11) according to a trigger signal.

2. The singling apparatus (1) as claimed in claim 1, characterized in that the guidance elements (7) are rollers and the cylindrical bodies (2) are conveyed in an interspace (12) between the rollers (7).

3. The singling apparatus (1) as claimed in claim 1, characterized in that the singling apparatus (1) includes a jamming detection device (13) which is realized for the purpose of detecting the abutting of one or more cylindrical bodies (2) on the height guidance (10) and thereupon generating a trigger signal for lifting the height guidance (10).

4. The singling apparatus (1) as claimed in claim 3, characterized in that the jamming detection device (13) is realized for the purpose of acquiring whether cylindrical bodies (2) are present, in the conveyance direction, in front of the height guidance (10) and whether in a region after the height guidance (10) no cylindrical bodies (2) exist, and if these two conditions are met, to generate the trigger signal.

5. The singling apparatus (1) as claimed in claim 3, characterized in that the jamming detection device (13) includes a first presence detector which in a region of a conveyor path (16) of the cylindrical bodies (2) in front of the height guidance (10) detects the presence of cylindrical bodies (2), and a second presence detector which in a region of the conveyor path (16) of the cylindrical bodies (2) after the height guidance (10) detects the presence of cylindrical bodies (2).

6. The singling apparatus (1) as claimed in claim 5, characterized in that one or both presence detectors is/are a light barrier (14), (15), respectively, and, with respect to the conveyor path (16) are each so disposed that the beam of the light barrier (14), (15), if the cylindrical bodies (2) are directly successive on the conveyor path (16), extends in each case through several of the cylindrical bodies (2).

7. The singling apparatus (1) as claimed in claim 1, characterized in that the height guidance (10) is disposed in the proximity of a back-force wheel (17) and blades (16) of the back-force wheel (17) have each a cutout (19) which corresponds to the form of the height guidance (10) and the blades (16), at least in a region in which the height guidance (10) is not yet effective, project downwardly beyond the height guidance (10).

8. The singling apparatus (1) as claimed in claim 1, characterized in that the singling apparatus (1) includes an ejection arrangement (21) which detects cylindrical bodies (2), which, while they are caught with their projection (5) on the guidance elements (7), however whose second end (3) is not suspended downwardly, and ejects them from the single row (8).

9. The singling apparatus (1) as claimed in claim 8, characterized in that the ejection arrangement (21) includes a parallel-position detection device (22) with a presence detector (23) and a position detector (24), wherein the presence detector (23) determines the presence of a cylindrical body (2) between the guidance elements (7) and the position detector (24) determines the orientation of the cylindrical body (2), and the parallel-position detection device (22) in the presence of a cylindrical body (2) with incorrect orientation triggers the ejection of the cylindrical body (2).

10. The singling apparatus (1) as claimed in claim 9, characterized in that the presence detector (22) is a light barrier.

11. The singling apparatus (1) as claimed in claim 9, characterized in that the position detector (24) detects a presence of the second ends (3) of the cylindrical bodies (2) in a region beneath the guidance elements (7).

12. The singling apparatus (1) as claimed in claim 9, characterized in that the position detector (24) includes an ultrasonic sensor (25), which measures the distance from the ultrasonic sensor (25) to the expected position of the second ends (3) of the cylindrical bodies (2), and, if this distance exceeds a predetermined value, the position detector (24) signals the incorrect orientation of the particular cylindrical body (2).

13. The singling apparatus (1) as claimed in claim 8, characterized in that the ejection arrangement (21) includes a movable ejection means (26), which, for the purpose of ejecting an incorrectly oriented cylindrical body (2), moves from below between the guidance elements (7) and thus lifts this cylindrical body (2) and ejects it.

14. The singling apparatus (1) as claimed in claim 8, characterized in that the ejection arrangement (21) includes an associated blow-gun device (27) for laterally blowing away a cylindrical body (2) after the lifting.

15. The singling apparatus (1) as claimed in claim 1, characterized in that the singling apparatus (1) further includes a resting detection facility (28), which acquires whether a cylindrical body (2) is resting on the cylindrical bodies (2) conveyed in the single row (8), and, if this is the case, activates an associated blow-gun device (31) for laterally blowing away a cylindrical body (2) from the guidance elements (7) respectively the single row (8).

16. The singling apparatus (1) as claimed in claim 15, characterized in that the resting detection facility (28) includes a light barrier (29) whose beam (30) extends substantially horizontally and at an angle to the course of the guidance elements (7), respectively the single row (8), and whose height is set such that the light barrier (28) responds in the event of resting cylindrical bodies (2).

17. The singling apparatus (1) as claimed in claim 15, characterized in that the blow-gun device (27) associated with the ejection arrangement (21) is identical with the blow-gun device (31) associated with the resting detection facility (28).

18. A method for singling cylindrical bodies (2) which comprise at a first end at least one projection (5) and have at a second end a diameter less than the diameter of the projection (5), wherein the cylindrical bodies (2) are set up between a pair of parallel oriented guidance elements (7) thereby that the cylindrical bodies (2) are each suspended by the projection (5) on the guidance elements (7) and the cylindrical bodies (2) form a single row (8) along the guidance elements (7) and in this way are conducted to a run-off (9) for further conveyance of the cylindrical bodies (2), characterized in that the cylindrical bodies (2) are conveyed beneath a height guidance (10) disposed above the single row (8), wherein a distance between the height guidance (10) and the cylindrical bodies (2), viewed in the conveyance direction, decreases up to a predetermined distance from the guidance elements (7), whereby vertically projecting cylindrical bodies (2), thereby that they are conveyed in the conveyance direction, are pushed downwardly by the height guidance (10), and wherein the height guidance (10) is briefly lifted by means of a lifting arrangement (11) according to a trigger signal.

19. The method as claimed in claim 18, characterized in that there is a determination whether a cylindrical body (2), while existing at a predetermined site along the guidance elements is not suspended downwardly on the projection (5), and, if this is the case, the cylindrical body (2) is ejected from the single row (8).

20. The method as claimed in claim 18, characterized in that there is a determination whether a cylindrical body (2) is resting on the cylindrical bodies (2) conveyed in the single row (8), and, if this is the case, the cylindrical body (2) is blown away from the guidance elements (7) respectively the single row (8).

* * * * *